(12) United States Patent
Telem

(10) Patent No.: US 11,394,857 B1
(45) Date of Patent: Jul. 19, 2022

(54) PHOTO BOOTH SYSTEM CONFIGURED FOR ROTARY IMAGE GENERATION

(71) Applicant: Boaz Telem, Ness Ziona (IL)

(72) Inventor: Boaz Telem, Ness Ziona (IL)

(73) Assignee: Foto Master Ltd., Rehovot (IL)

( * ) Notice: Subject to any disclaimer, the term of this patent is extended or adjusted under 35 U.S.C. 154(b) by 0 days.

(21) Appl. No.: 17/648,944

(22) Filed: Jan. 26, 2022

(51) Int. Cl.
H04N 5/222 (2006.01)
H04N 5/225 (2006.01)
H04N 5/232 (2006.01)

(52) U.S. Cl.
CPC ......... *H04N 5/2251* (2013.01); *H04N 5/2256* (2013.01); *H04N 5/2257* (2013.01); *H04N 5/23203* (2013.01); *H04N 5/23216* (2013.01); *H04N 5/23299* (2018.08)

(58) Field of Classification Search
CPC .... H04N 5/222; H04N 5/2224; H04N 5/2228; H04N 5/225; H04N 5/2251; H04N 5/2256; H04N 5/23216; H04N 5/23299; G03B 17/56; G03B 17/561; G03B 17/563; G08B 13/19628; G08B 13/19632
USPC .................................................... 348/207.99
See application file for complete search history.

(56) References Cited

U.S. PATENT DOCUMENTS

| 7,502,174 | B2 * | 3/2009 | Jensen | A61B 6/485 348/370 |
| 9,408,540 | B2 | 8/2016 | Mueller et al. | |
| 9,641,730 | B2 | 5/2017 | Rosenberry et al. | |
| 10,386,703 | B1 | 8/2019 | Evans | |
| 10,841,473 | B2 | 11/2020 | Telem | |
| 2007/0098378 | A1 * | 5/2007 | Giacomuzzi | F16M 11/2014 396/1 |
| 2012/0230668 | A1 * | 9/2012 | Vogt | H04N 5/2251 396/428 |
| 2015/0077564 | A1 * | 3/2015 | Swindord | H04N 7/18 348/148 |
| 2017/0242322 | A1 * | 8/2017 | Godfrey | H04N 5/2251 |
| 2018/0241948 | A1 * | 8/2018 | Jang | G06F 3/04886 |
| 2021/0055633 | A1 * | 2/2021 | Stotts | G03B 17/561 |

* cited by examiner

*Primary Examiner* — Anthony J Daniels
(74) *Attorney, Agent, or Firm* — Haim M. Factor

(57) ABSTRACT

A photo booth system for image generation of a subject, comprising: a base unit having a stabilizing base and a rotational connector rotated about a rotational axis oriented normal to the base unit and parallel to the stabilizing base; a boom having a fixed end removably connected to the rotational connector and a free end offset from the base unit by 90 degrees; a mobile device configured to control all functions of the system, the mobile device removably connected to the free end; an illumination source configured on the boom, and directed towards the subject during rotation of the boom from a first side of the subject, over and above, and to a second side of the subject; wherein the mobile device is configured to generate images of the subject, characterized by at least 180 degrees of rotation of the boom, from the first side, above, and the second side of the subject.

3 Claims, 4 Drawing Sheets

View A – A

PHOTO BOOTH SYSTEM CONFIGURED FOR ROTARY IMAGE GENERATION

FIELD OF INVENTION AND BACKGROUND

Embodiments of the current invention relate to entertaining photo booths and specifically to a photo booth system configured for rotary image generation.

In the specification and claims which follow, the term "image generation" is intended to mean any form of photography, including single and multiple images and video—as known in the art. In the specification and claims which follow, the term "mobile device" is intended to mean a smartphone, a tablet, or another similar device having a camera and having wired and wireless communication capability. Mobile devices, as known in the art, have operating software and additional software referred to as "apps" or "applications".

Traditional photo booths are well-known—where one or more people enter a closed or covered structure/booth, then stand or sit in front of a camera, and where frontal photographs are typically taken. Traditional photo booths have evolved over the years to a similar, conventional form of photography, whereby a user sits or stands directly in front of a camera, which produces either a standard image (as in traditional photo booth configurations) or a video or a GIF image/video created by a setup of a multi-camera array, as described in a product by iboothme.com, Mazaya Business Avenue, Tower AA1, 17$^{th}$ Floor-Office 1703, Jumeriah Lakes Towers, Dubai, United Arab Emirates.

Another prior art product, called "Mirror Me", by Foto-Master Ltd. (the assignee of the current patent application) serves to enable a user to stand freely, without the need of a closed/covered booth, to operate a photography process, as described in U.S. Pat. No. 10,841,473, incorporated herein by reference, in which Telem discloses a photo terminal stand system having a case, a one-way mirror, a computer display for presenting a graphical presentation seen through the one-way mirror, a camera, a touch overlay frame, a computer, configured to receive touch input from the touch overlay frame and responsively to activate the camera to record an image or a video sequence, a camera flash, and at least one of a reflector, a wheel bumper brake, and a service step ladder.

Mueller et al., in U.S. Pat. No. 9,408,540, whose disclosure is incorporated by reference, describe an imaging system that includes a rotating unit that includes an imaging camera, an alignment camera and at least a first monitor. The rotating unit is rotatable between a home position and a finish position about a rotation axis such that the imaging camera can capture a first scan. The alignment camera is directed generally downwardly and is configured to capture a first alignment image of a subject positioned generally co-axially with the rotation axis. The first alignment image is displayed on the first monitor.

In U.S. Pat. No. 10,386,703, whose disclosure is incorporated by reference, Evans describe systems and methods for capturing an orbiting image of a subject. The system includes a rotatable turntable mountable to an overhead surface with a spindle formed therein and a retractable line extending therefrom at a proximal end thereof. First and second lines extend from a distal end of retractable line in opposite directions as retractable line is extended from an exterior of rotatable turntable. The system further includes an imaging assembly with a housing and an interior compartment in which housing includes first and second rotors at first and second ends thereof such that first and second lines are connected to first and second rotors. Interior compartment receives a multimedia device attached thereto and is at least partially visible from an exterior of housing. A remote control is configured to control the rotatable turntable to in turn control speed of rotation of imaging assembly, and the length of line extended or retracted from/to spindle, and further configured to control first and second rotors to in turn control angle of multimedia device. Imaging assembly is rotated from above the subject along a rotation path to enable 360 degree orbiting image capture while the subject is in motion or static during operation.

Rosenberry et al., in U.S. Pat. No. 9,641,730, whose disclosure is incorporated by reference, describe an apparatus for generating, capturing, and/or recording an image having a platform assembly having a top plate coupled to a rod coupled to a base plate; and a recording assembly having a pivoting arm, a balancing arm, and pipe having a bore, wherein the pivoting arm is connected to the pipe, and the balancing arm is connected to the pipe opposite the pivoting arm; wherein the recording assembly rotates independently of the platform assembly is disclosed. Also disclosed herein is a method for generating, capturing and/or recording an image.

However, none of the prior art feature a straightforward setup using a mobile device for full, vertical, at least 180-degree video and/or still image generation of one or more subjects.

There is therefore a need for a versatile and easily set-up photo booth system, including an arm having balance and movement and one or more display screens, wherein one or more subjects are photographed from the front, top, rear, and sides using an existing mobile device portable device.

SUMMARY OF THE INVENTION

According to one aspect of the present invention, there is provided a photo booth system configured for rotary image generation of a subject, the system comprising: a base unit having a stabilizing base and a rotational connector which is configured to be rotated about a rotational axis oriented substantially normal to the base unit and substantially parallel to the stabilizing base; a boom having a fixed end removably connected to the rotational connector and a free end offset from the base unit by substantially 90 degrees; a mobile device configured to control all functions of the photo booth system, the mobile device removably connected to the free end of the boom; an illumination source configured on the boom, with the illumination source being directed towards the subject during rotation of the boom from a first side of the subject, over and above the subject, and to a second side of the subject; wherein the mobile device is configured to controllably generate images of the subject, characterized by at least 180 degrees of rotation of the boom, from the first side, above, and the second side of the subject. Preferably, the mobile device has wired and wireless communication capability, a mobile device display, and a camera. Most preferably, the mobile device has a user interface, configured to control at least one dedicated photo booth system software. Typically, the mobile device is positioned within reach of the subject and receives commands from the subject. Most typically, the mobile device is configured to be primarily operated by the subject and additionally remotely operated by an operator.

Preferably, the mobile device is operated by the subject by tactile and voice commands. Most preferably, the boom further includes two elbows. Typically, the boom is configured to enable smooth motion and to minimize vibrations thereof, the boom being made of any strong, lightweight material. Most typically, the illumination source includes a lightweight assembly of illuminators, the illuminators producing white light and light having at least one color. Preferably, the base unit further includes: a cover assembly; a base unit display unit controlled by the mobile device; a processing and communications subsystem controlled by the mobile device and by the operator; a power source configured to provide power for the system; a motor configured to rotate the rotational connector; and a motor controller configured to control the motor, the motor controller controlled by the processing and communications system. Most preferably, the mobile device is connected to the base unit by a wire connection providing power and communications between the mobile device and the base unit display unit. Typically, the stabilizing base is configured to minimize undesirable vibrations and to stabilize the base unit, the stabilizing base being made of a heavy material.

According to another aspect of the present invention, there is further provided a method of operating a photo booth system configured for rotary image generation of a subject, the system comprising: a base unit having a stabilizing base and a rotational connector which is configured to be rotated about a rotational axis oriented substantially normal to the base unit and substantially parallel to the stabilizing base; a boom having a fixed end removably connected to the rotational connector and a free end offset from the base unit by substantially 90 degrees; a mobile device configured to control all functions of the photo booth system, the mobile device mobile removably connected to the free end of the boom; an illumination source configured on the boom, with the illumination source directed towards the subject during rotation of the boom from a first side of the subject, over and above the subject, and to a second side of the subject; wherein the mobile device is configured to controllably generate images of the subject, characterized by at least 180 degrees of rotation of the boom, from the first side, above, and the second side of the subject; the method including the operation cycle steps of: positioning the subject substantially aligned with the rotational axis, in front of the base unit, with the mobile device directed towards the subject, with the subject able to touch and operate the mobile device, and with the boom having an initial position of the first side of the subject; readying and powering on the mobile device and readying a photo booth system software thereupon; readying and powering on the base unit primarily by the subject using the mobile device with subject tactile and voice commands, and secondarily, remotely, by an operator; operating the photo booth system to create images of the subject as the boom moves generally from the first side, then above, and then to the second side of the subject, with a speed and position of the boom speed and position being a boom movement and with boom movement, illumination control and image creation being controlled by the photo booth system software and by a dedicated illumination control software of the mobile device, according to a preset sequence and according to commands given to the mobile device while the photo system is operating; showing images on the mobile device display and on the display unit, which are visible to the subject, during system operation, with created images stored by the mobile device and a slideshow, generated by the mobile device, being displayed on the display unit; processing stored images, when the operation cycle is complete, to yield additional fixed and video images and combinations thereof, with stored and processed images exported to remote devices, including at least one chosen from the list including: remote storage; remote displays; and email users; and commanding the mobile device to complete the operation cycle by the operator and by the subject. Preferably, the operation cycle is programmed on the photo booth system software including a starting and an ending point. Most preferably, when the operation cycle is completed, textual and audible instructions are given the subject to allow another subject to operate the system for a new cycle.

LIST OF DRAWINGS

The invention is described herein, by way of example only, with reference to the accompanying drawings, wherein.

DETAILED DESCRIPTION

Embodiments of the current invention relate to entertaining photo booths and specifically to a photo booth system configured for rotary image generation.

Figure 1:
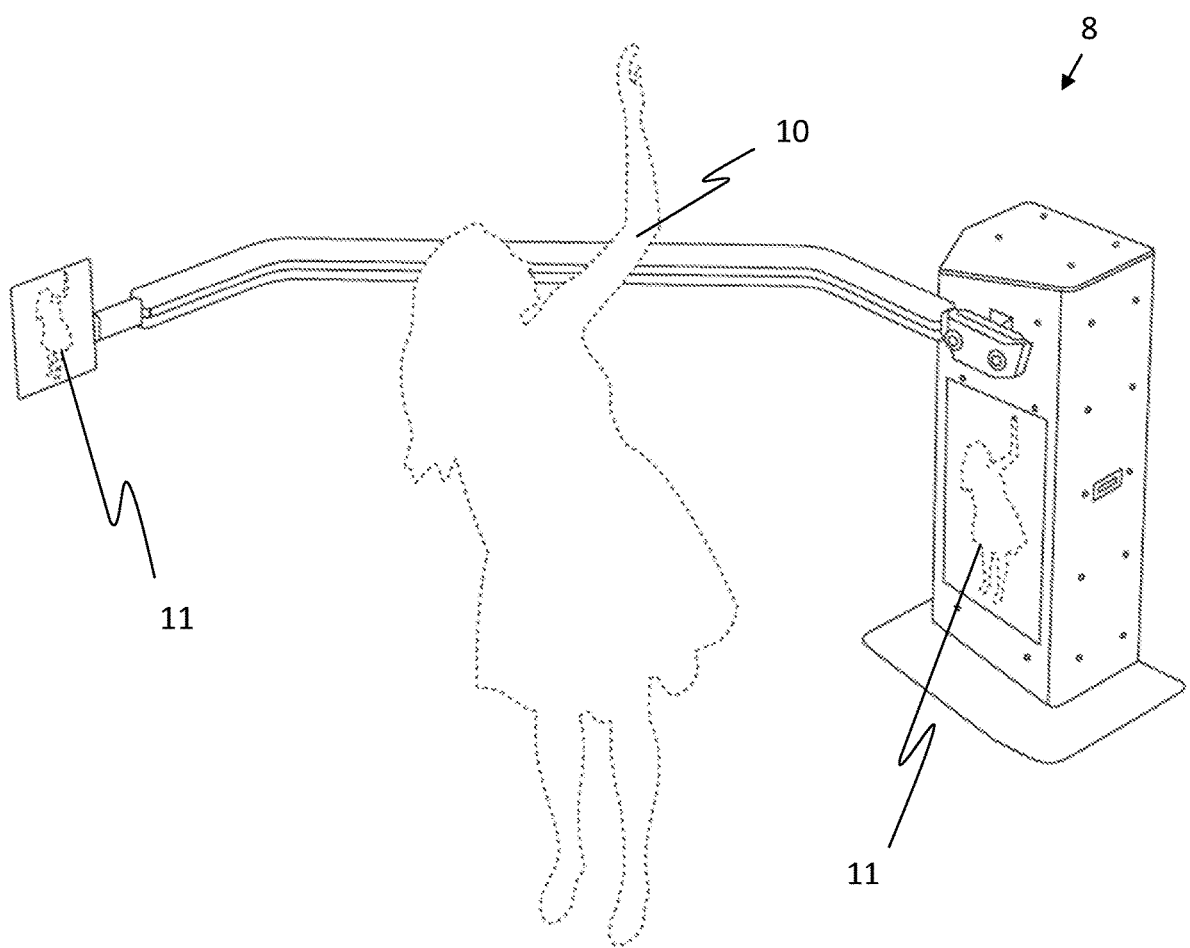
FIGS. 1 and 2 are isometric representations of a photo booth system, in accordance with embodiments of the current invention.
Figure 2:
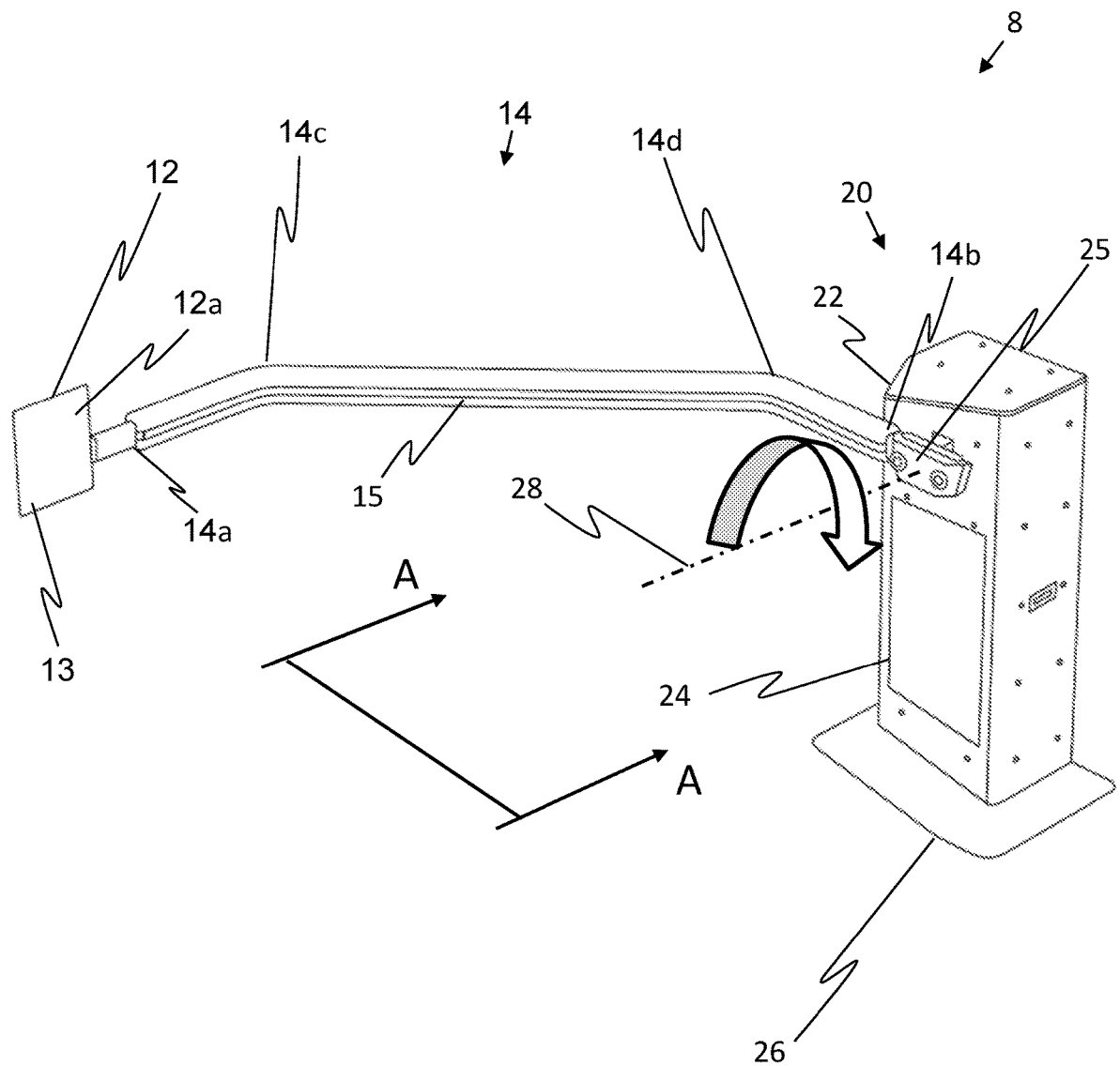

Reference is currently made to FIGS. 1 and 2, which are isometric representations of a photo booth system 8, in accordance with embodiments of the current invention. The photo booth system is used to view a subject 10 and to generate a plurality of exemplary images 11. (Subject 10 and exemplary images 11 are not shown in FIG. 2 for purposes of clarity.) Subject 10 is typically at least one person.

Photo booth system 8 includes: a mobile device 12 having a mobile device display 12a, and a camera 13; a boom 14 having an illumination source 15; and a base unit 20. Mobile device 12 is configured with camera 13 directed towards subject 10. Boom 14 has a free end 14a, to which mobile device 12 is removably connected/mounted, and a fixed end 14b, which is removably connected to base unit 20. Whereas fixed end 14b is typically mechanically connected to the base unit, the fixed end may be removed from the base unit for transport purposes, inter alia. The mobile device is positioned so that it is within reach of the subject, as further described hereinbelow. The mobile device has its own power source, as known the art, but alternatively or optionally may be connected to a power source, as noted hereinbelow.

Boom 14 has a two elbows 14c and 14d, which served to offset free end 14a from base unit 20 by substantially 90 degrees, allowing the free end to rotate around a rotational axis 28, configured normal to base unit 20, as shown in FIG. 2 and as described further hereinbelow. Boom 14 is balanced, as known in the art, to enable smooth motion and to minimize vibrations, the boom being made of any strong, lightweight material, such as, but not limited to: aluminum, plastic, and composite material.

Illumination source 15 includes a lightweight assembly and/or array of illuminators such as, but not limited to: LED; and fluorescent. The illumination source is configured on boom 14 and is directed towards subject 10, so that the subject is illuminated as the boom moves from a first side of the subject, then over and above the subject, and to a second side of the subject, as described hereinbelow. The illumination source produces white light and/or light having one or more colors.

Base unit 20 includes: a cover assembly 22 (including one or more panels as shown in the figures); a display unit 24; a mechanical rotational connector 25 to which the fixed end of boom 14 is mechanically attached; a base unit stabilizing base 26; and the rotational axis 28 about which mechanical rotational connector 25, and thereby boom arm 14, are rotated, as further described hereinbelow. Stabilizing base 26 serves to minimize undesirable vibrations and to stabilize the base unit, and the stabilizing base is made of a heavy material, as known in the art. Cover assembly additionally serves to protect the base unit and to enable safe and easy transport thereof.

Although not shown in the figures, base unit 20 additionally includes a processing and communications subsystem, a motor controller, a motor, and a power source unit. The processing and communications subsystem interacts with mobile device 12 as well as with other devices associated with the photo booth system to control the motor controller.

The motor controller functions to command the motor to rotate mechanical rotational connector 25 about the rotational axis. The power source unit serves to provide power for the processing and communications subsystem, the motor controller, the display unit, and the mobile device, as noted hereinabove. The power source unit is typically connected to mains power, but may have other power connections, such as, but not limited to: battery power; and a power generation array. Although not visible in the figures, a wire, running through/along the boom from the power source unit, serves to connect mobile device 12 to power, when desired, and additionally serves as an HDMI cable, as known in the art, to connect the mobile device with the display unit.

Mobile device 12 serves to control all functions of the photo booth system, including boom movement, illumination control and functioning, and image generation, as further described hereinbelow. The mobile device has a user interface, which controls at least one dedicated app, referred to hereinbelow as a "photo booth system software". Whereas the mobile device is primarily operated by the subject, the mobile device may additionally be operated remotely by an operator and/or the operator may remotely, directly operate the processing and communications subsystem of base unit 20. Operator operation of the photo booth system, as noted hereinabove, may occur when the system is initialized, during shut down of the system, or in special circumstances, inter alia.

Figure 3:
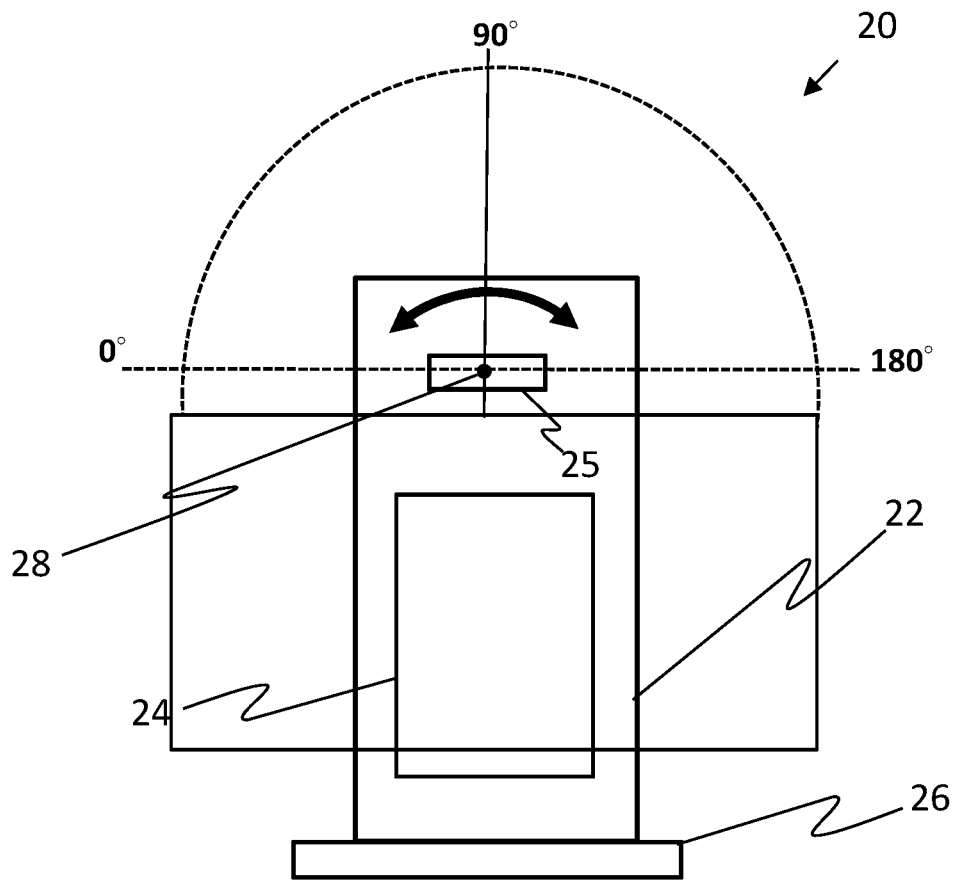
FIG. 3 is an orthographic view A-A of the base unit shown in FIG. 2, in accordance with embodiments of the current invention.

Reference is currently made to FIG. 3, which is an orthographic view A-A of the base unit shown in FIG. 2, in accordance embodiments of the current invention. Apart from differences described below, base unit 20 of FIG. 3 is identical in notation, configuration, and functionality as described in FIG. 2 hereinabove. As shown in FIG. 3, mechanical connector 25 (and likewise boom 14, shown in FIG. 2) is rotated about rotational axis 28, which is oriented substantially normal to base unit 20 and substantially parallel to the stabilizing base, as shown in the FIGS. 2 and 3. Rotation of the mechanical connector takes place about the rotational axis, between at least 0 and at least 180 degrees, as shown schematically in FIG. 3. In this way, free end 14a (ref FIG. 2), which is offset by substantially 90 degrees, as noted previously, is rotated about the subject: from the first side, above, and to the second side—characterized by at least 180 degrees of rotation, the rotation as shown in FIG. 3.

Figure 4:
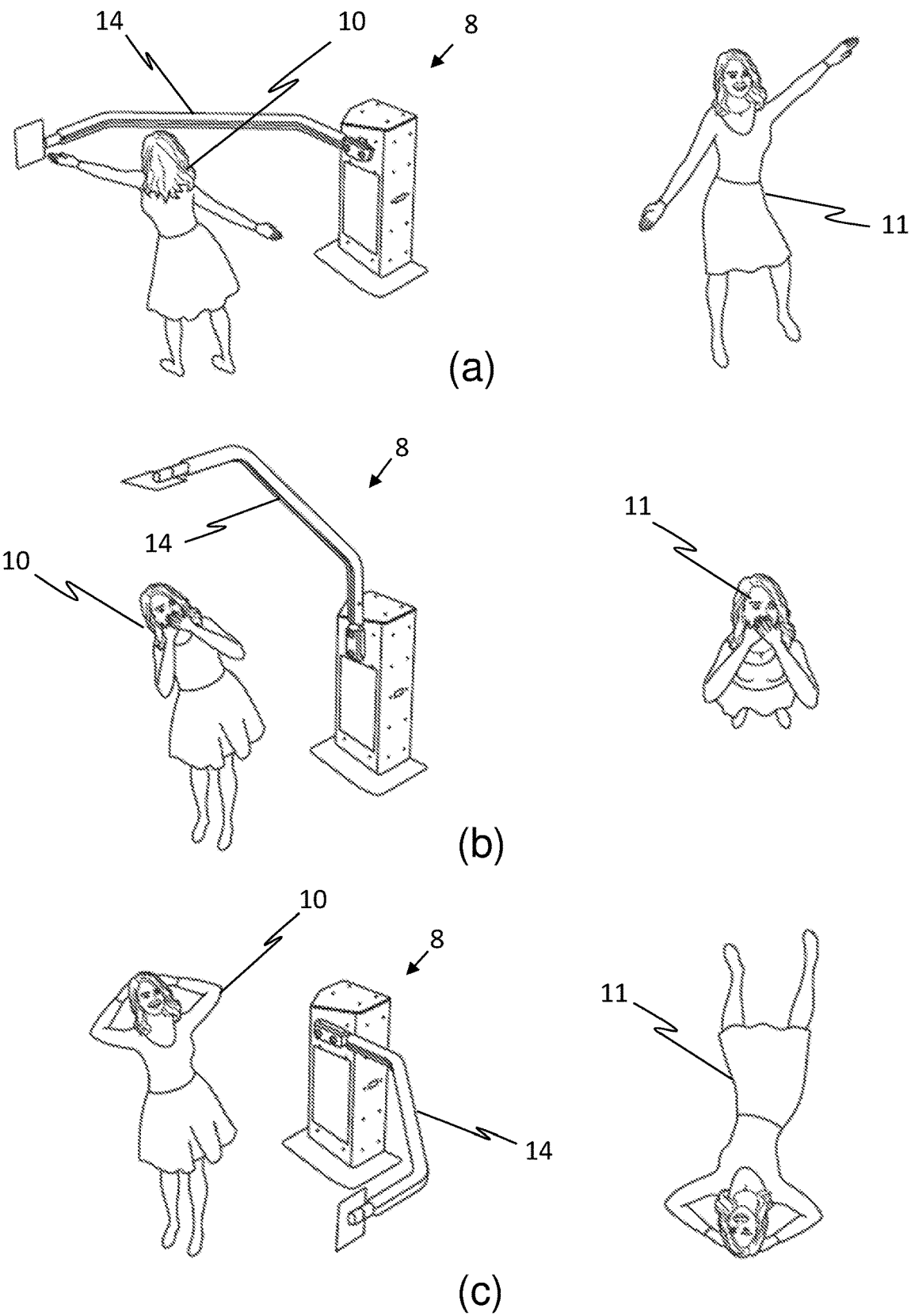
FIG. 4 is a series of three pairs of views, respectively showing the photo booth system with the subject and the boom in three orientations, and with the respective image, in accordance with embodiments of the current invention.

Reference is currently made to FIG. 4, which is a series of three pairs of views, respectively showing photo booth system 8 with subject 10 and boom 14 in three orientations, and with respective image 11, in accordance with embodiments of the current invention. Apart from differences described below, photo booth system 8, subject 10, image 11, and boom 14 of FIG. 4 are identical in notation, configuration, and functionality as described in FIGS. 1-2 hereinabove. (It is noted that image 11 is not shown in the photo booth system of views (a)-(c) only for purposes of clarity.) FIG. 4 shows three positions of boom 14 (ref FIG. 2) and respective, resultant images of the subject as the boom moves from a first side of the subject (view a) to above the subject degrees (view b) and then to a second side of the subject (view c)—characterized by at least 180 degrees of rotation, as shown in FIG. 3. It is noted that whereas image 11 is shown inverted in view c, the photo booth system software may optionally or additionally serve to rotate inverted images by 180 degrees for display purposes.

Photo booth system 8 functions according to the following exemplary operation cycle steps:

1. The subject is positioned in front of the base unit, substantially aligned with the rotational axis, with the mobile device directed towards the subject, and with the subject able to touch/operate the mobile device, as substantially shown in FIG. 1. The boom has an exemplary initial position of the first side of the subject, as shown in FIGS. 1-3 and FIG. 4 (a).
2. The mobile device is readied and powered on, including readying the photo booth system software.
3. The base unit is readied and powered on, primarily by the subject using the mobile device or secondarily, remotely, by an operator (the operator not shown in the figures). Subject commands, include, but are not limited to: tactile and voice commands.
4. The photo booth system is operated and begins to create images of the subject, as the boom moves generally from a first side, then above, and then to a second side of the subject, as shown in FIG. 4, views (a) to (c). Optionally or alternatively, a speed and a position of the boom (i.e., "boom movement") are controlled, as noted hereinbelow. Boom movement, illumination control (including intensity and/or colors), and image creation (including individual images and/or video) are controlled by the photo booth system software, or by a dedicated illumination control software of the mobile device, according to a preset sequence or according to commands given to the mobile device while the photo system is operating.
5. During system operation, created images may be shown substantially simultaneously on the mobile device display and on the display unit—both of which are visible to the subject—as can be seen in FIG. 4, views (a) to (c). Alternatively or optionally, a slideshow, generated by the mobile device, is displayed on the display unit. Created images are stored by the mobile device.
6. When the operation cycle proceeds is complete, stored images may be further processed to yield additional fixed and/or video images and/or combinations thereof. Stored and processed images may be exported to remote devices, such as, but not limited to: remote storage; remote displays; and email users.
7. The operation cycle is completed when the operator and/or the subject commands the mobile device thereto.

The operation cycle described hereinabove is programmed on the photo booth system software including a starting and an ending point. During operation, textual instructions appear on mobile device display 12a (ref FIG. 2) and/or instructions may be audibly presented to the subject, prompting a subject response—such as, but not limited to: "start system"; "touch/command to start again"; and "enter/say your email to share". Once the operation cycle is completed, textual or audible instructions are given the subject to allow another subject to operate the system for a new cycle.

It will be appreciated that the above descriptions are intended only to serve as examples, and that many other embodiments are possible within the scope of the present invention and as defined in the appended claims.

The invention claimed is:

1. A method of operating a photo booth system configured for rotary image generation of a subject, the system comprising:
- a base unit having a stabilizing base and a rotational connector which is configured to be rotated about a rotational axis oriented substantially normal to the base unit and substantially parallel to the stabilizing base, and the base unit having a display unit;
- a boom having a fixed end removably connected to the rotational connector and a free end offset from the base unit by substantially 90 degrees;
- a mobile device configured to control all functions of the photo booth system, the mobile device having a user interface serving to control at least one dedicated photo booth system software, the mobile device mobile removably connected to the free end of the boom and the mobile device further having a mobile device display;
- an illumination source configured on the boom, with the illumination source directed towards the subject during rotation of the boom from a first side of the subject, over and above the subject, and to a second side of the subject;
- wherein the mobile device is configured to controllably generate images of the subject, characterized by at least 180 degrees of rotation of the boom, from the first side, above, and the second side of the subject;

the method including the operation cycle steps of:
- a. positioning the subject substantially aligned with the rotational axis, in front of the base unit, with the mobile device directed towards the subject, with the subject able to touch and operate the mobile device, and with the boom having an initial position of the first side of the subject;
- b. readying and powering on the mobile device and readying a photo booth system software thereupon;
- c. readying and powering on the base unit by the subject using the mobile device with subject tactile and voice commands, and additionally, remotely, by an operator;
- d. operating the photo booth system to create images of the subject as the boom moves generally from the first side, then above, and then to the second side of the subject, with a speed and a position of the boom being a boom movement and with the boom movement, the illumination control, and the image creation being controlled by the photo booth system software and by a dedicated illumination control software of the mobile device, according to a preset sequence and according to commands given to the mobile device while the photo system is operating;
- e. showing images on the mobile device display and on the display unit, which are visible to the subject, during system operation, with created images stored by the mobile device and a slideshow, generated by the mobile device, being displayed on the display unit;
- f. processing stored images, when the operation cycle is complete, to yield additional fixed and video images and combinations thereof, with stored and processed images exported to remote devices, including at least one chosen from the list including: remote storage; remote displays; and email users; and
- g. commanding the mobile device to complete the operation cycle by the operator and by the subject.

2. The method according to claim 1, whereby the operation cycle is programmed on the photo booth system software including a starting and an ending point.

3. The method according to claim 2, whereby when the operation cycle is completed, textual and audible instructions are given to the subject to allow another subject to operate the system for a new cycle.

* * * * *